(12) United States Patent
Yamamoto

(10) Patent No.: US 8,462,438 B2
(45) Date of Patent: Jun. 11, 2013

(54) LENS FOR PROJECTION AND PROJECTION-TYPE DISPLAY APPARATUS

(75) Inventor: Chikara Yamamoto, Saitama (JP)

(73) Assignee: Fujifilm Corporation, Tokyo (JP)

(*) Notice: Subject to any disclaimer, the term of this patent is extended or adjusted under 35 U.S.C. 154(b) by 114 days.

(21) Appl. No.: 13/211,514

(22) Filed: Aug. 17, 2011

(65) Prior Publication Data

US 2012/0044585 A1 Feb. 23, 2012

(30) Foreign Application Priority Data

Aug. 19, 2010 (JP) ................................ 2010-183599

(51) Int. Cl.
*G02B 3/00* (2006.01)
*G02B 9/00* (2006.01)
*G02B 13/18* (2006.01)
*G02B 3/02* (2006.01)

(52) U.S. Cl.
USPC ......................................... 359/651; 359/717

(58) Field of Classification Search
USPC ................. 359/649, 651, 717, 751, 755, 663, 359/793
See application file for complete search history.

(56) References Cited

U.S. PATENT DOCUMENTS

| | | | |
|---|---|---|---|
| 4,443,070 A * | 4/1984 | Fujioka | ........................... 359/755 |
| 5,731,676 A | 3/1998 | Nakamats | |
| 5,745,297 A | 4/1998 | Kaneko et al. | |
| 7,057,830 B2 | 6/2006 | Ebbesmeier | |

FOREIGN PATENT DOCUMENTS

| | | |
|---|---|---|
| JP | 2003287676 | 10/2003 |
| JP | 2005164839 | 6/2005 |
| JP | 2005173494 | 6/2005 |
| JP | 4076334 | 4/2008 |

* cited by examiner

Primary Examiner — Alicia M Harrington
(74) Attorney, Agent, or Firm — Young & Thompson

(57) ABSTRACT

In constructing a lens for projection substantially consisting of seven lenses, and the reduction side of which is telecentric, a first-lens-group is composed of two lenses including at least one negative lens. A second-lens-group is composed of a positive second-group first-lens having a convex surface facing the magnification side, a negative second-group second-lens having a concave surface facing the magnification side, a positive second-group third-lens having a convex surface facing the reduction side, a positive second-group fourth-lens, and a positive second-group fifth-lens in this order from the magnification side. The formulas (A) and (B) are satisfied:

$$1.2 \leq Bf/f \leq 2.5 \quad (A);$$

and $$f23/f \leq 1.5 \quad (B),$$

where
Bf is a back focus in air of an entire lens system,
f is the focal length of the entire lens system, and
f23 is the focal length of an air lens between a reduction-side surface of the second-group second-lens and a magnification-side surface of the second-group third-lens.

17 Claims, 9 Drawing Sheets

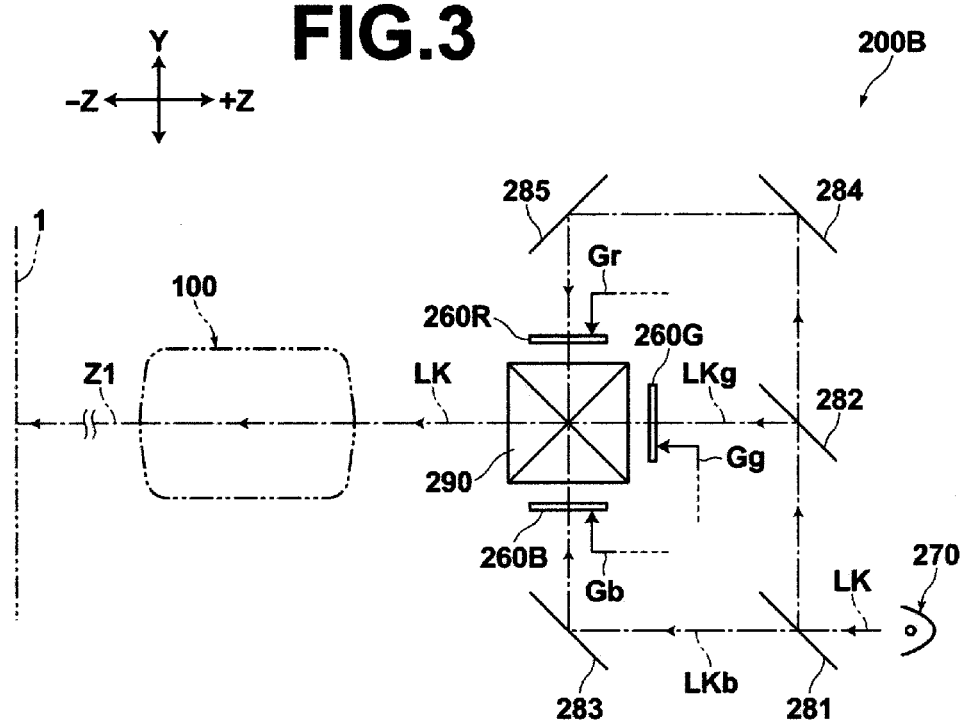
FIG.3
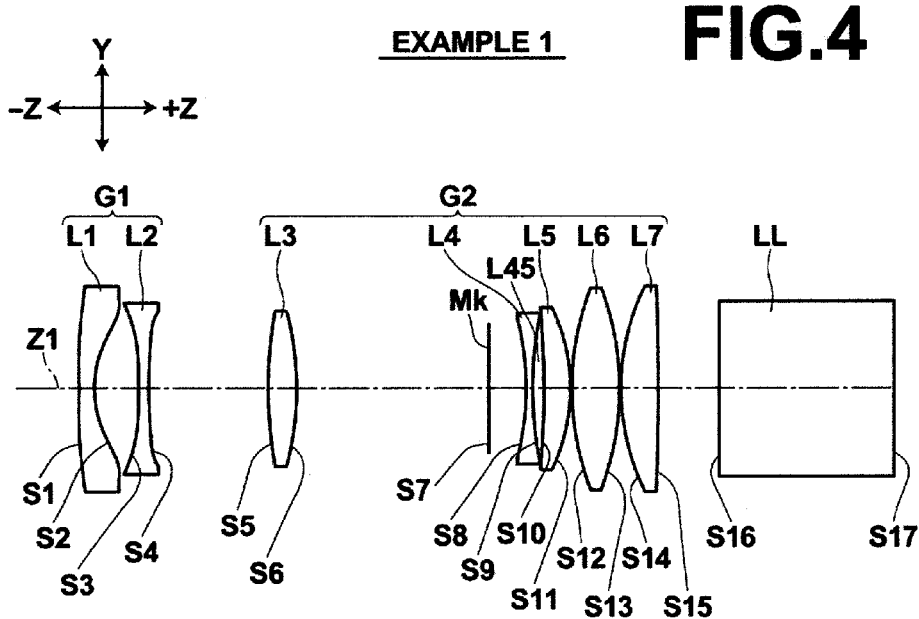
FIG.4 EXAMPLE 1

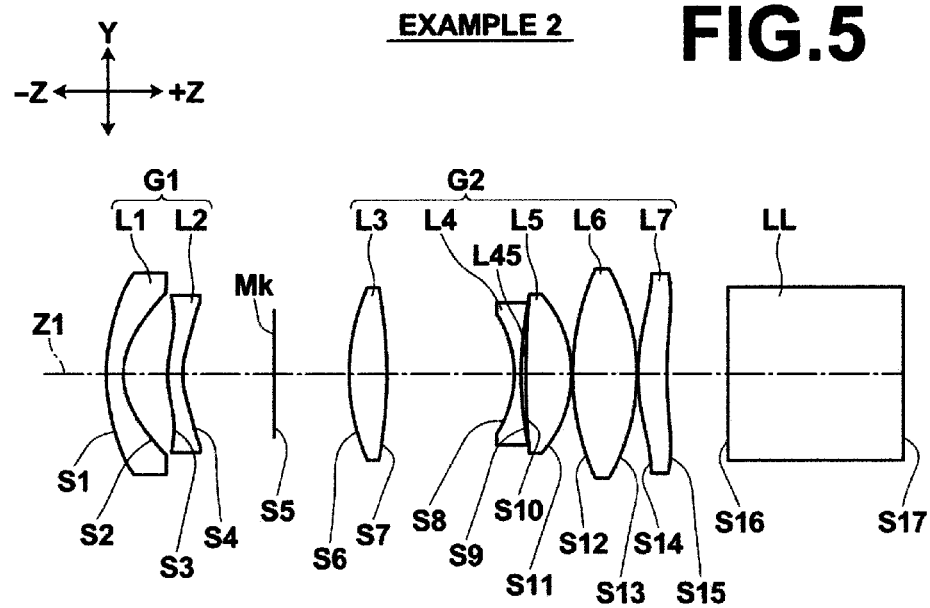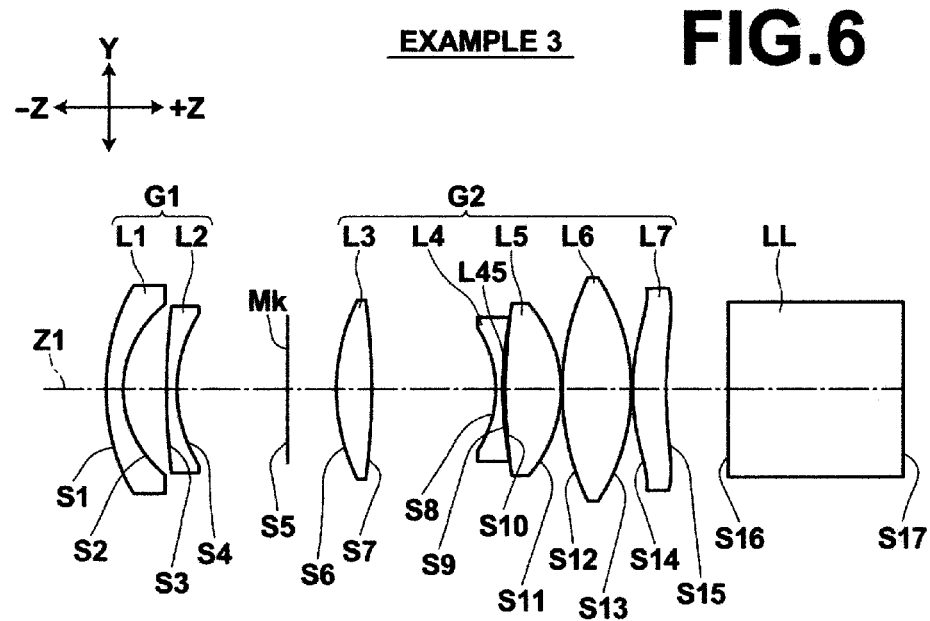

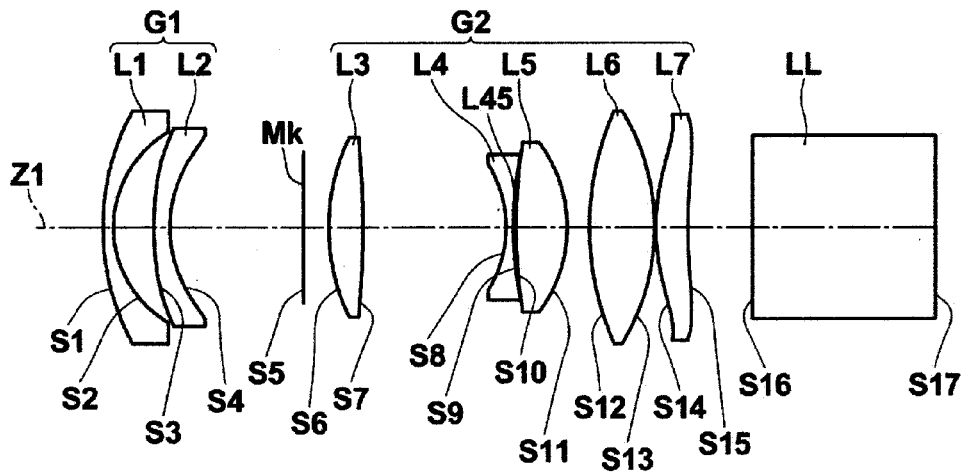
FIG.7 EXAMPLE 4
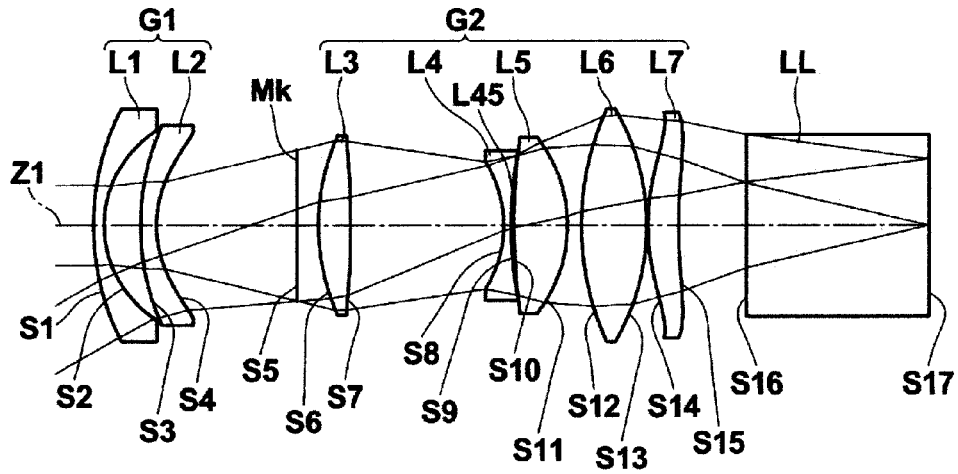
FIG.8 EXAMPLE 5

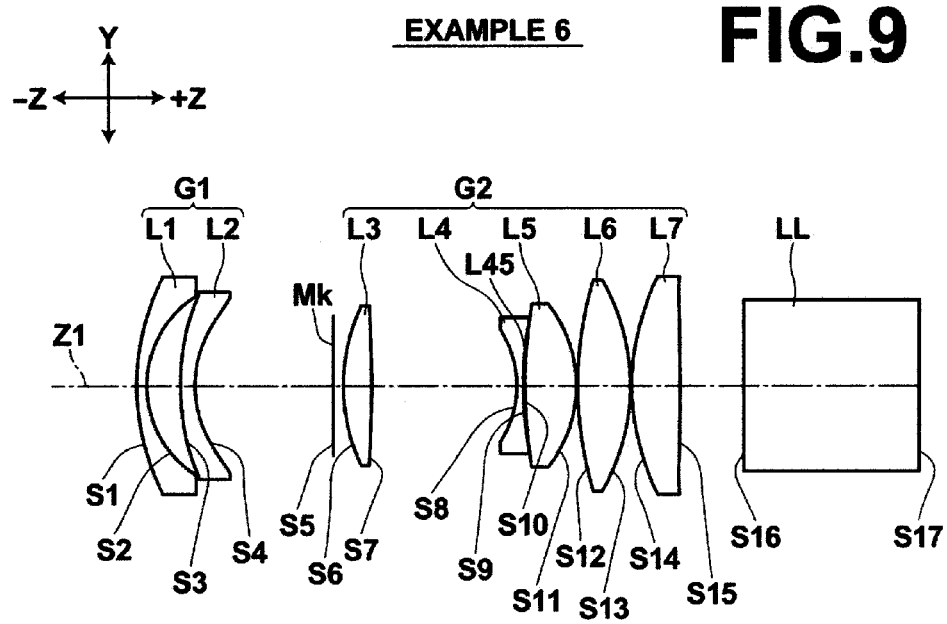
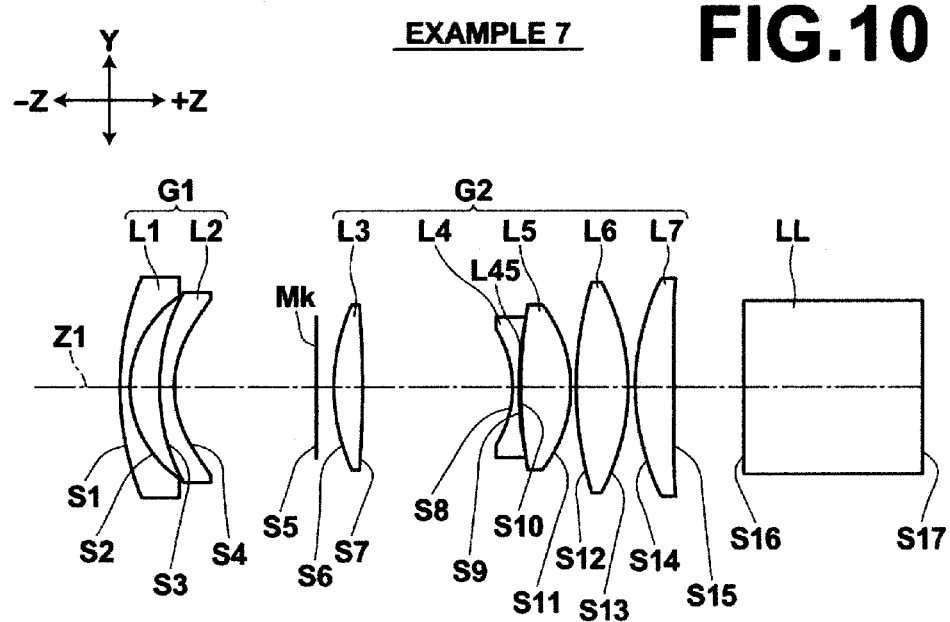

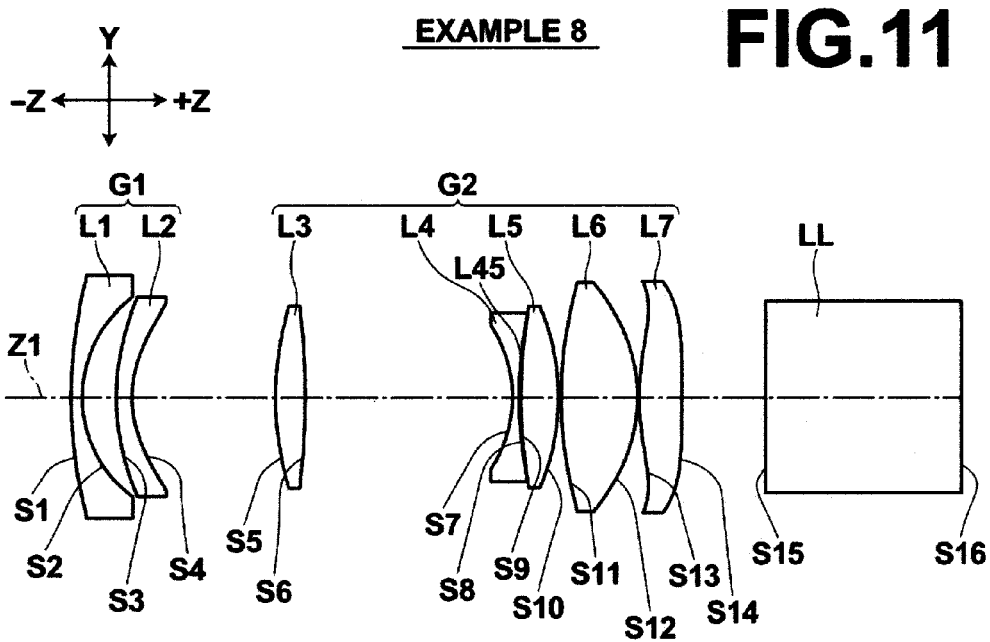

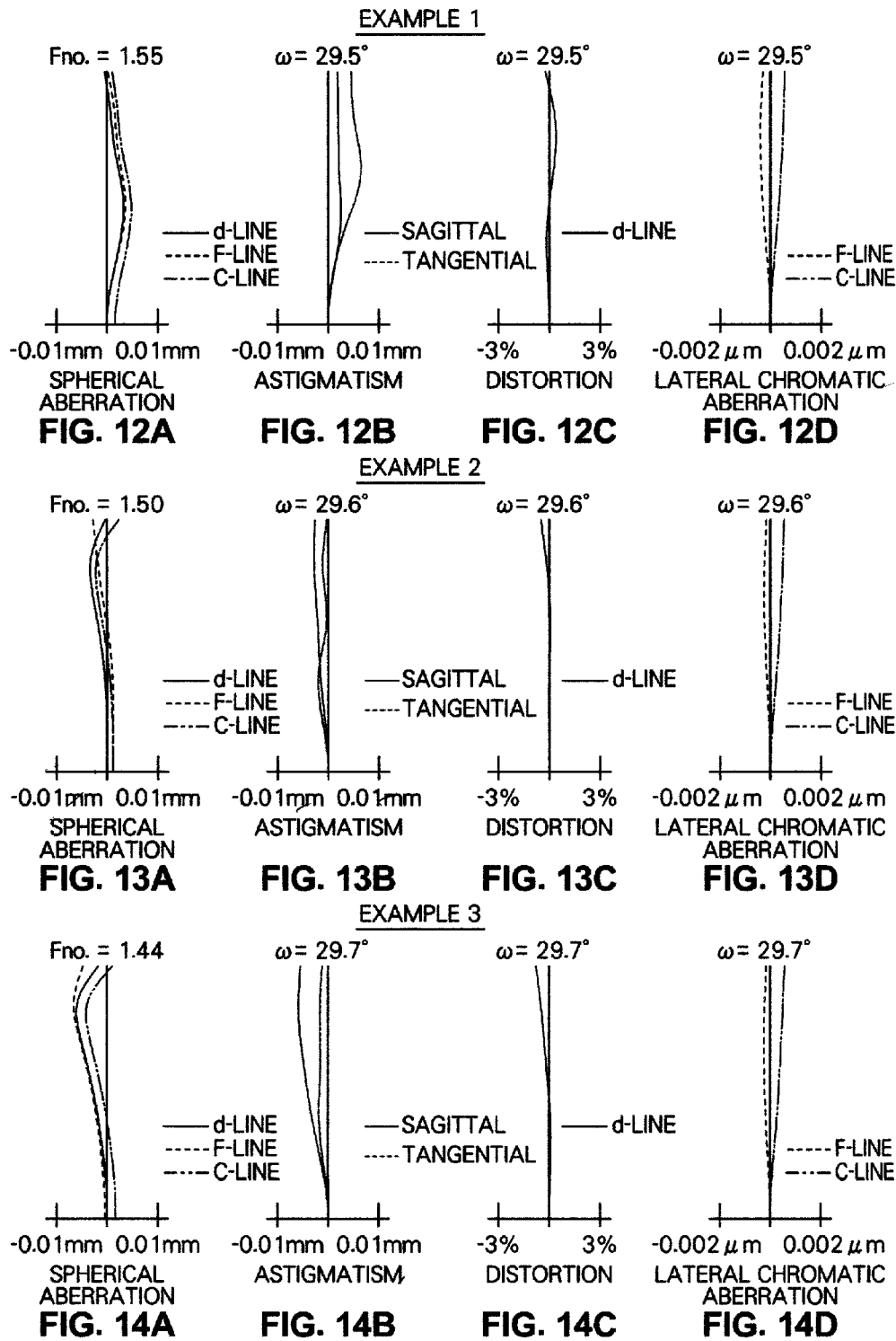

EXAMPLE 4

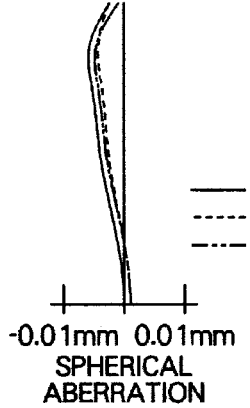
Fno. = 1.44
-0.01mm 0.01mm
SPHERICAL ABERRATION
FIG. 15A

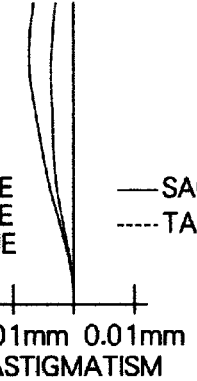
ω = 29.8°
-0.01mm 0.01mm
ASTIGMATISM
FIG. 15B

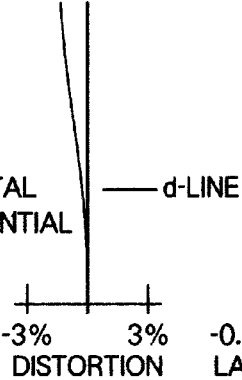
ω = 29.8°
-3%  3%
DISTORTION
FIG. 15C

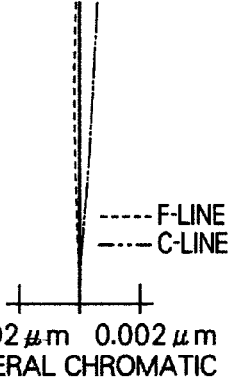
ω = 29.8°
-0.002μm 0.002μm
LATERAL CHROMATIC ABERRATION
FIG. 15D

EXAMPLE 5

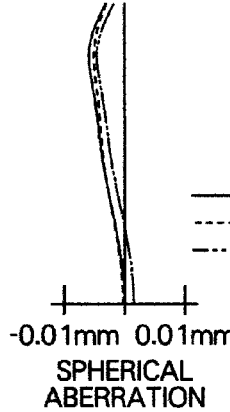
Fno. = 1.44
-0.01mm 0.01mm
SPHERICAL ABERRATION
FIG. 16A

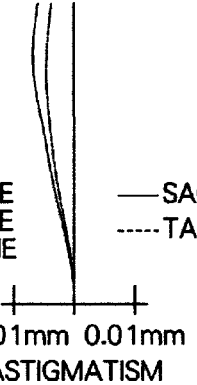
ω = 29.8°
-0.01mm 0.01mm
ASTIGMATISM
FIG. 16B

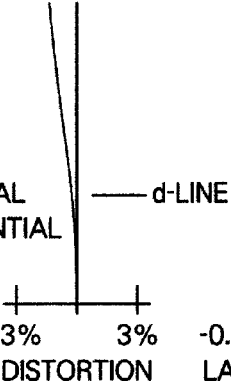
ω = 29.8°
-3%  3%
DISTORTION
FIG. 16C

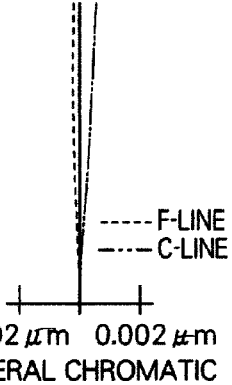
ω = 29.8°
-0.002μm 0.002μm
LATERAL CHROMATIC ABERRATION
FIG. 16D

EXAMPLE 6

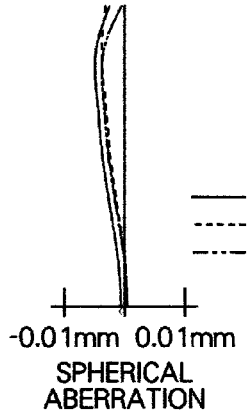
Fno. = 1.54
-0.01mm 0.01mm
SPHERICAL ABERRATION
FIG. 17A

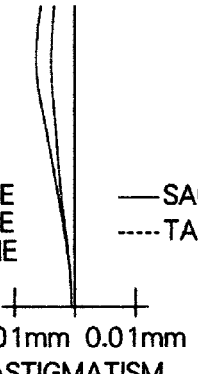
ω = 29.8°
-0.01mm 0.01mm
ASTIGMATISM
FIG. 17B

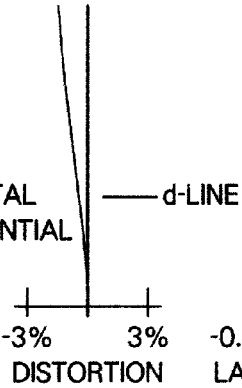
ω = 29.8°
-3%  3%
DISTORTION
FIG. 17C

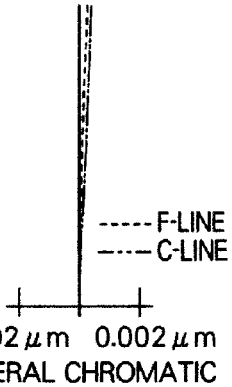
ω = 29.8°
-0.002μm 0.002μm
LATERAL CHROMATIC ABERRATION
FIG. 17D

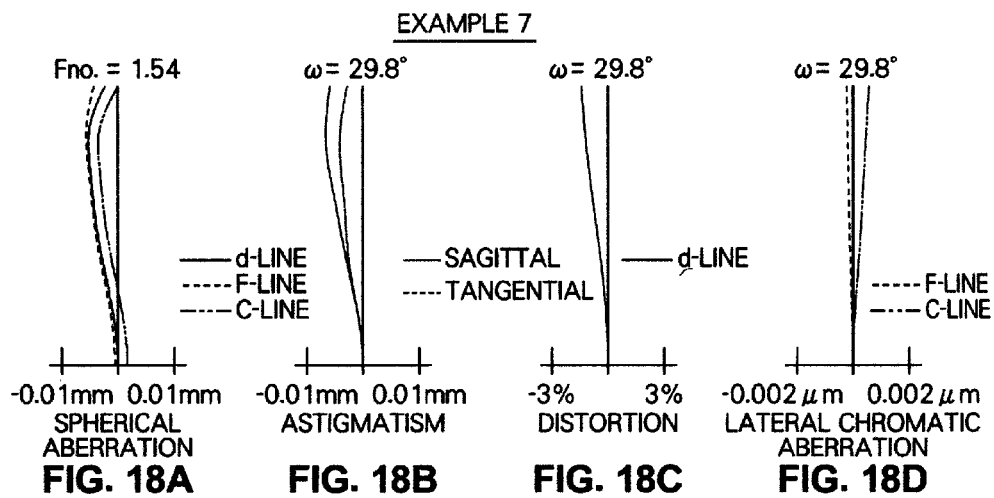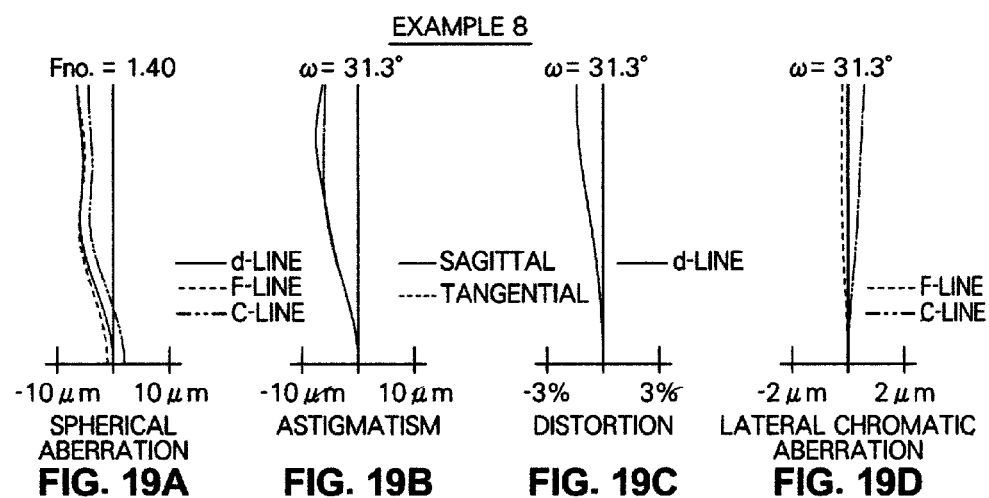

LENS FOR PROJECTION AND PROJECTION-TYPE DISPLAY APPARATUS

BACKGROUND OF THE INVENTION

1. Field of the Invention

The present invention relates to a lens for projection and a projection-type display apparatus, and particularly to a lens for projection substantially consisting of seven lenses and a projection-type display apparatus using the lens for projection.

2. Description of the Related Art

In recent years, projection-type display apparatuses (also called as projectors) for projecting, onto screens, images represented by image data output from personal computers or the like rapidly spread. As such projectors, a projector that projects, onto a screen, light that has been output from a light source and modulated by a light valve is known. As the light valve, a transmission-type liquid crystal device, a reflection-type liquid crystal device, a DMD (Digital Micromirror Device), and the like are known. In the DMD, micromirrors, the angles of which are changeable, are arranged.

Such a projector needs to have a space for arranging an optical path for guiding light output from the light source to the light valve and an optical path for guiding light modulated by the light valve to the lens for projection. Therefore, a lens for projection mounted on the projector has a long back focus so that such a space is provided between the lens for projection and the light valve.

For example, a projector for projecting color images, and which includes light valves for modulating red light, green light and blue light respectively, needs to have a space for arranging optical paths for guiding light of each color to respective light valves and optical paths for guiding light modulated by the light valves to a lens for projection.

As a lens for projection in which a back focus is set to provide such a space, a lens for projection composed of seven lenses, and which has an F-number in the range of 2.4 to 6.4 is known (please refer to Japanese Unexamined Patent Publication No. 2003-287676 (Patent Document 1), Japanese Unexamined Patent Publication No. 2005-164839 (Patent Document 2), Japanese Unexamined Patent Publication No. 2005-173494 (Patent Document 3), U.S. Pat. No. 5,745,297 (Patent document 4), Japanese Patent No. 4076334 (Patent Document 5), and Specification of U.S. Pat. No. 5,731,676 (Patent document 6)).

Further, although a back focus is short, a lens for projection composed of seven lenses with a small F-number of 1.7 (fast lens) is known (please refer to Specification of U.S. Pat. No. 7,057,830 (Patent Document 7)).

Here, when the number of lenses is counted, if a cemented lens composed of n lenses is included, the number of lenses of the cemented lens is regarded as n.

When images are projected onto a screen through a projector, a setting place of the screen is generally made dark, but a demand for watching images without making the place very dark is strong. However, projectors in which lenses for projection having relatively large F-numbers, as disclosed in Patent Documents 1 through 6, are mounted do not meet such a demand. Meanwhile, a projector in which a lens for projection having a small F-number (fast lens), as disclosed in Patent Document 7, is mounted may meet the demand, but there is a problem that the back focus of the lens for projection is short.

Specifically, in the lenses for projection disclosed in Patent Documents 1 through 6, if F-numbers are reduced (faster lenses) without changing the distribution of power balance of lenses (arrangement of positive and negative lenses), the size of apparatuses becomes large. Further, it becomes difficult to suppress generation of various aberrations, which lower the resolution of the lenses for projection.

In the lens for projection (F-number: 1.7) disclosed in Patent Document 7, if the back focus is increased without changing the distribution of power balance of lenses (arrangement of positive and negative lenses), the size of an apparatus becomes large. Further, it becomes difficult to suppress generation of various aberrations, which lower the resolution of the lens for projection.

SUMMARY OF THE INVENTION

In view of the foregoing circumstances, it is an object of the present invention to provide a lens for projection having a small F-number (fast lens) while suppressing generation of aberrations and an increase in the size of an apparatus. Further, it is another object of the present invention to provide a projection-type display apparatus using the lens for projection.

A lens for projection of the present invention is a lens for projection substantially consisting of:

a first lens group; and a second lens group, which are arranged in this order from the magnification side of the lens for projection.

wherein the lens for projection is composed of seven lenses, and wherein the reduction side of the lens for projection is telecentric, and wherein the first lens group is composed of two lenses including at least one negative lens, and wherein the second lens group is composed of a positive second-group first lens having a convex surface facing the magnification side, a negative second-group second lens having a concave surface facing the magnification side, a positive second-group third lens having a convex surface facing the reduction side of the lens for projection, a positive second-group fourth lens, and a positive second-group fifth lens, which are arranged in this order from the magnification side, and wherein a space is provided between a reduction-side surface of the second-group second lens and a magnification-side surface of the second-group third lens, and wherein the following formulas (A) and (B) are satisfied:

$$1.2 \leq Bf/f \leq 2.5 \tag{A}$$

and $$f23/f \leq 1.5 \tag{B},$$

where

Bf is a back focus in air of an entire lens system, f is the focal length of the entire lens system, and f23 is the focal length of an air lens formed between the reduction-side surface of the second-group second lens and the magnification-side surface of the second-group third lens.

Hereinafter, back focus Bf in air of an entire lens system is simply referred to also as back focus Bf.

It is more desirable that the lens for projection satisfies the following formula (B'):

$$f23/f \leq -2.0 \tag{B'}.$$

The expression "a lens for projection substantially consisting of n lens groups" includes lenses for projection which are equipped with: lenses substantially without any power; optical elements other than lenses, such as apertures and glass covers; and mechanical components, such as lens flanges, lens barrels, imaging elements, and camera shake correcting mechanisms; in addition to the n lens groups.

Further, it is desirable that the lens for projection satisfies the following formula (C):

$$-0.8 \leq f2F/f1F \leq -0.2 \quad (C),$$

where f2F is the focal length of a magnification-side surface of the second-group second lens, and f1F is the focal length of a magnification-side surface of the second-group first lens.

Further, it is desirable that the lens for projection satisfies the following formulas (D) and (E):

$$1.5 \leq f1/f \leq 3.0 \quad (D);$$

and $$-2.5 \leq f2/f \leq -0.5 \quad (E),$$

where f1 is the focal length of the second-group first lens, and f2 is the focal length of the second-group second lens.

Further, it is more desirable that the lens for projection satisfies the following formula (E'):

$$-2.0 \leq f2/f \leq -0.7 \quad (E').$$

It is desirable that the lens for projection satisfies the following formula (F):

$$0.8 \leq d12/f \leq 2.2 \quad (F),$$

where d12 is an air space between the first lens group and the second lens group.

The air space between the first lens group and the second lens group is an air space, on an optical axis, between a most-reduction-side lens surface in the first lens group and a most-magnification-side lens surface in the second lens group.

It is more desirable that the lens for projection satisfies the following formula (F'):

$$1.0 \leq d12/f \leq 1.8 \quad (F').$$

It is desirable that the lens for projection satisfies the following formula (G):

$$Fno \leq 1.7 \quad (G),$$

where

Fno is the F-number of the entire lens system.

In the lens for projection, it is desirable that at least one of surfaces of the lenses constituting the first lens group is aspheric.

In the lens for projection, it is desirable that at least one of surfaces of the second-group fourth lens and the second-group fifth lens is aspheric. Further, it is desirable that both of at least one aspheric lens in the first lens group and the second-group fifth lens are made of resin. Further, it is desirable that the following formula (H) is satisfied:

$$-1.1 \leq fF/f5 \leq -0.2 \quad (H),$$

where fF is the focal length of each aspheric lens made of resin in the first lens group, and f5 is the focal length of the second-group fifth lens made of resin.

Further, a projection-type display apparatus of the present invention is a projection-type display apparatus comprising:

a lens for projection of the present invention;

a light source; and a light valve that modulates rays of light output from the light source, wherein the rays of light modulated by the light valve are projected through the lens for projection.

The focal length of an air lens is a combined focal length in air of the focal length of the magnification-side surface of the air lens and the focal length of the reduction-side surface of the air lens. Specifically, the focal length of an air lens is represented by the following equation:

1/Focal Length of Air Lens=(1−Refractive Index of Magnification-Side Lens)/Radius of Curvature of Magnification-Side Surface of Air Lens+(Refractive Index of Reduction-Side Lens)/Radius of Curvature of Reduction-Side Surface of Air lens+ (1−Refractive Index of Magnification-Side Lens)×(1−Refractive Index of Reduction-Side Lens)×Air Space/(Radius of Curvature of Magnification-Side Surface of Air lens×Radius of Curvature of Reduction-Side Surface of Air lens).

The lens for projection may be composed of only single lenses. Alternatively, the lens for projection may include a cemented lens or cemented lenses.

The expression "the reduction side is telecentric" represents a state in which a line bisecting an angle between the upper maximum ray and the lower maximum ray in a cross section of rays of light condensing into an arbitrary reduction-side point is nearly parallel to an optical axis, as illustrated in a cross section of FIG. 8 (Example 5). Therefore, the state is not limited to a completely telecentric state. In other words, the state is not limited to a state in which the line bisecting the angle is completely parallel to the optical axis. Therefore, some difference may be present between the bisecting line and the optical axis. Here, some difference means that the inclination of the bisecting line with respect to the optical axis is within the range of ±3°.

When the number of lenses is counted, if a cemented lens composed of n lenses is included, the number of lenses of the cemented lens is regarded as n. Further, an air lens is not counted when the number of lenses is counted.

Back focus is a length (in air) on an optical axis between a most-reduction-side surface of lens surfaces constituting the lens for projection and a focal point on the reduction side of the lens for projection.

The focal length of each lens and the focal length of plural lenses in combination (combined focal length) are classified into positive and negative. The focal length of a lens or lenses is regarded as being positive when a focal point of rays passed through the lens or lenses is located on the exit side of the lens or lenses. The focal length of a lens or lenses is regarded as being negative when a focal point of rays passed through the lens or lenses is located on the incident side of the lens or lenses.

Focal length Fsurf of a lens surface is obtained by using the following equation:

$$Fsurf=r/(n2-n1),$$

where n1 is the refractive index of a medium on the magnification side of the lens surface, n2 is the refractive index of a medium on the reduction side of the lens surface, and r is the radius of curvature of the lens surface.

The radius of curvature is positive when the surface is convex toward the magnification side, and negative when the surface is convex toward the reduction side.

Further, the term "reduction-side surface of a lens" means a lens surface formed on the reduction side of the lens. Further, the term "magnification-side surface of a lens" means a lens surface formed on the magnification side of the lens.

With respect to aspheric lenses, the term "positive" and the term "negative" are used to refer to whether a paraxial region of an aspheric lens is positive or negative. Further, with respect to aspheric surfaces, the term "positive", the team "negative", the term "concave", and the term "convex" are used to refer to whether a paraxial region of an aspheric surface is positive or negative, and concave or convex.

According to a lens for projection of the present invention and a projection-type display apparatus of the present invention, a lens for projection substantially consists of a first lens group, and a second lens group, which are arranged in this order from the magnification side of the lens for projection. Further, the lens for projection is composed of seven lenses, and the reduction side of the lens for projection is telecentric. Further, the first lens group is composed of two lenses including at least one negative lens. The second lens group is composed of a positive second-group first lens having a convex surface facing the magnification side, a negative second-group second lens having a concave surface facing the magnification side, a positive second-group third lens having a convex surface facing the reduction side of the lens for projection, a positive second-group fourth lens, and a positive second-group fifth lens, which are arranged in this order from the magnification side. Further, a space is provided between a reduction-side surface of the second-group second lens and a magnification-side surface of the second-group third lens. Further, the following formulas (A) and (B) are satisfied:

$$1.2 \leq Bf/f \leq 2.5 \quad \text{(A)};$$

and $$f23/f \leq -1.5 \quad \text{(B)},$$

where
Bf is a back focus in air of an entire lens system,
f is the focal length of the entire lens system, and
f23 is the focal length of an air lens formed between the reduction-side surface of the second-group second lens and the magnification-side surface of the second-group third lens.

Therefore, it is possible to make the F-number of the lens for projection smaller (faster lens), while suppressing generation of aberrations and an increase in the size of an apparatus Specifically, in the present invention, the arrangement of positive and negative lenses (power balance) is appropriately set as described above. Therefore, it is possible to maintain the balance of aberrations in an excellent manner, while constituting the lens for projection using a small number of lenses (seven lenses). Further, it is possible to provide a lens for projection that has a small F-number (fast lens) without causing the size of an apparatus to become large. Therefore, it is possible to obtain a lens for projection that is small in size and light in weight, and that has excellent performance.

If the lens for projection is constructed in such a manner that the value of Bf/f is lower than the lower limit defined by the formula (A), which defines the range of the ratio of back focus Bf to focal length f of the entire lens system, a space for arranging an optical system for illumination and an optical system for guiding light, or the like becomes small. The optical system for illumination guides light output from a light source to a light valve, and the optical system for guiding light guides light modulated by the light valve to the lens for projection. Consequently, it becomes difficult to arrange an optical system for illumination and an optical system for guiding light.

In contrast, if the lens for projection is constructed in such a manner that the value of Bf/f exceeds the upper limit defined by the formula (A), the size of the lens for projection becomes large. Consequently, the size of an apparatus becomes large.

Further, if the lens for projection is constructed in such a manner that the value of f23/f exceeds the upper limit defined by the formula (B), which defines the range of the ratio of focal length f23 of an air lens to focal length f of the entire lens system, correction of an image plane becomes difficult.

BRIEF DESCRIPTION OF THE DRAWINGS

FIG. 3 is an enlarged cross section of another light modulation unit included in a projection-type display apparatus, FIG. 4 is a schematic cross section illustrating the structure of a lens for projection in Example 1, FIG. 5 is a schematic cross section illustrating the structure of a lens for projection in Example 2, FIG. 6 is a schematic cross section illustrating the structure of a lens for projection in Example 3, FIG. 7 is a schematic cross section illustrating the structure of a lens for projection in Example 4, FIG. 8 is a schematic cross section illustrating the structure of a lens for projection in Example 5, FIG. 9 is a schematic cross section illustrating the structure of a lens for projection in Example 6, FIG. 10 is a schematic cross section illustrating the structure of a lens for projection in Example 7, FIG. 11 is a schematic cross section illustrating the structure of a lens for projection in Example 8, FIGS. 12A, 12B, 12C and 12D are diagrams illustrating various aberrations of the lens for projection in Example 1, FIGS. 13A, 13B, 13C and 13D are diagrams illustrating various aberrations of the lens for projection in Example 2, FIGS. 14A, 14B, 14C and 14D are diagrams illustrating various aberrations of the lens for projection in Example 3, FIGS. 15A, 15B, 15C and 15D are diagrams illustrating various aberrations of the lens for projection in Example 4, FIGS. 16A, 16B, 16C and 16D are diagrams illustrating various aberrations of the lens for projection in Example 5, FIGS. 17A, 17B, 17C and 17D are diagrams illustrating various aberrations of the lens for projection in Example 6, FIGS. 18A, 18B, 18C and 18D are diagrams illustrating various aberrations of the lens for projection in Example 7, and FIGS. 19A, 19B, 19C and 19D are diagrams illustrating various aberrations of the lens for projection in Example 8.

DESCRIPTION OF THE PREFERRED EMBODIMENTS

Hereinafter, a lens for projection of the present invention and a projection-type display apparatus including the lens for projection will be described with reference to drawings.

Figure 1:
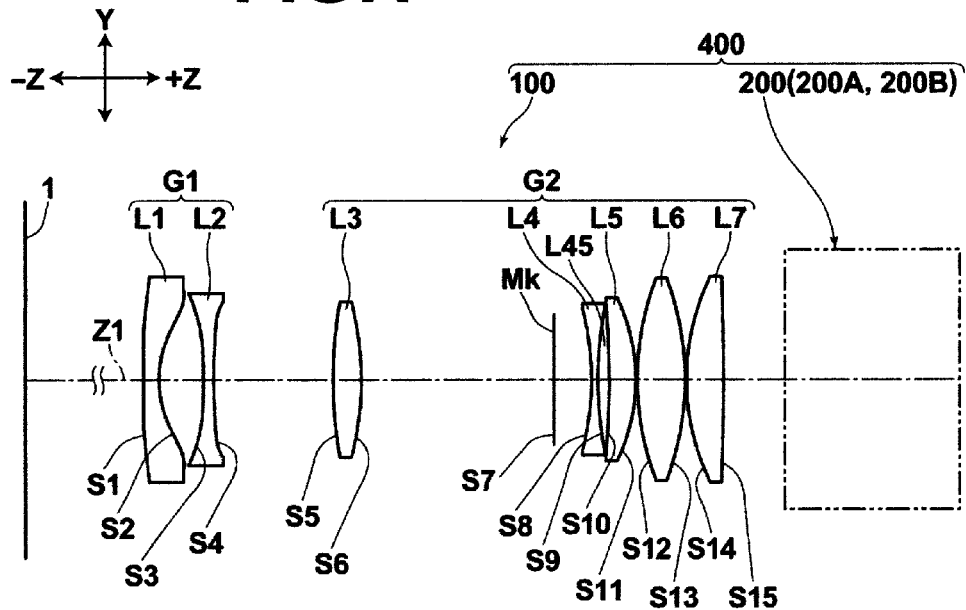
FIG. 1 is a schematic cross section illustrating the structure of a projection-type display apparatus including a lens for projection according to an embodiment of the present invention.

FIG. 1 is a schematic cross section illustrating the structure of a projection-type display apparatus including a lens for projection of the present invention.

A projection-type display apparatus 400 illustrated in FIG. 1 includes a lens 100 for projection and a light modulation unit 200. The light modulation unit 200 modulates, by a light valve, rays of light output from a light source. The rays of light modulated in the light modulation unit 200 pass through the lens 100 for projection, and are projected onto a screen 1.
<Basic Structure of Lens for Projection>

Next, the basic structure of the lens 100 for projection will be described.

The lens 100 for projection is composed of first lens group G1 and second lens group G2. Further, the lens 100 for projection is composed of seven lenses.

The lens 100 for projection substantially consists of first lens group G1, positive second-group first lens L3, negative second-group second lens L4, positive second-group third lens L5, positive second-group fourth lens L6, and positive second-group fifth lens L7, which are arranged in this order from the magnification side (the side indicated by arrow −Z in FIG. 1) of the lens 100 for projection. The first lens group G1 is composed of two lenses (first-group first lens L1 and first-group second lens L2), which are arranged in this order from the magnification side. The positive second-group first lens L3 has a convex surface facing the magnification side. The negative second-group second lens L4 has a concave surface facing the magnification side. The positive second-group third lens L5 has a convex surface facing the reduction side (the side indicated by arrow +Z in FIG. 1) of the lens 100 for projection. Further, the reduction side of the lens 100 for projection is telecentric.

Further, at least one of the two lenses constituting the first lens group G1 is a negative lens.

The lens 100 for projection has a space between reduction-side surface S9 of the second-group second lens L4 and magnification-side surface S10 of the second-group third lens L5. When Bf is a back focus, f is the focal length of the entire lens system, and f23 is the focal length of air lens L45 formed between the reduction-side surface S9 of the second-group second lens L4 and the magnification-side surface S10 of the second-group third lens L5, the following formulas (A) and (B) are satisfied at the same time:

$$1.2 \leq Bf/f \leq 2.5 \quad (A);$$

and $$f23/f \leq -1.5 \quad (B).$$

Further, the lens 100 for projection may include mask Mk.

The mask Mk is made of a material that blocks rays passing through the lens 100 for projection. For example, the mask Mk blocks rays passing through a peripheral area of the lens 100 for projection to secure the telecentricity of the lens 100 for projection. Further, the mask Mk is provided to set an F-number. In the diagrams, mask Mk is not illustrated in such a manner to represent the size nor the shape of the mask, but a position at which the mask is located in the direction of an optical axis.

The back focus Bf is a length (in air), on an optical axis, from a last lens surface of the lens 100 for projection (a lens surface arranged closest to the light modulation unit 200 among lens surfaces) to a rear-side focal point (a focal point of the lens 100 projection set on the light modulation unit 200 side).

Here, the back focus Bf corresponds to a length (in air), on an optical axis, from lens surface S15 to a light valve (a DMD 210 and liquid crystal panels 260R, 260G and 260B, which will be described later). The lens surface S15 is located on the most reduction side among lens surfaces constituting the lens 100 for projection.

Next, the light modulation unit 200 will be described.
<Regarding a light modulation unit using a DMD as a light valve>

Figure 2:
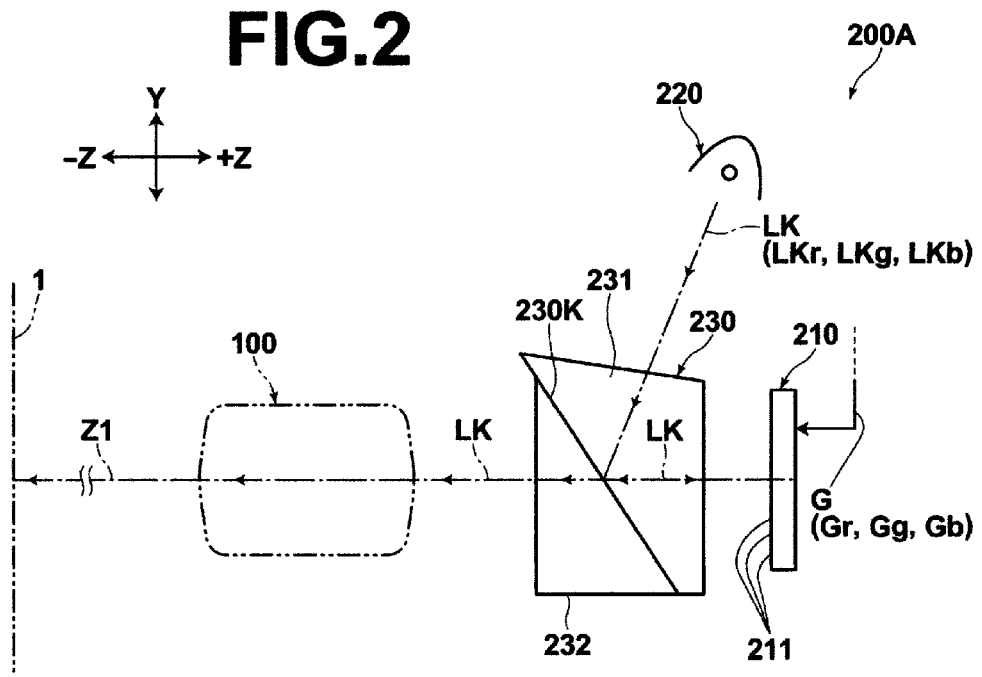
FIG. 2 is an enlarged cross section of a light modulation unit included in a projection-type display apparatus.

FIG. 2 is a diagram illustrating a light modulation unit adopting a DMD (Digital Micromirror Device) as a light valve.

A light modulation unit 200A illustrated in FIG. 2 includes a DMD 210, a light source 220, and a total internal reflection prism (hereinafter referred to as a TIR prism 230). The TIR prism 230 guides rays Lk of light output from the light source 220 to the DMD 210.

The rays Lk of light output from the light source 220 enter the TIR prism 230, and are totally reflected at a boundary plane 230K of two prisms 231, 232 constituting the TIR prism 230. The totally reflected rays Lk of light enter the DMD 210. Further, the rays Lk of light that have entered the DMD 210 are reflected by a multiplicity of micromirrors 211 constituting the DMD 210, and modulated. Specifically, the micromirrors 211 deflect rays Lk of light, based on image data G input to the DMD 210, to an ON direction (the direction of the lens 100 for projection) or to an OFF direction (a direction other than the direction of the lens 100 for projection). Accordingly, the rays Lk of light that have entered the DMD 210 are modulated.

The rays Lk of light modulated by the DMD 210 pass through the TIR prism 230, and enter the reduction side (the side indicated by arrow +Z in FIG. 2) of the lens 100 for projection. Further, the rays Lk of light are output from the magnification side (the side indicated by arrow −Z in FIG. 2) of the lens 100 for projection, and projected onto a screen 1. Accordingly, rays Lk of light modulated by the DMD 210 and magnified by the lens 100 for projection are projected onto the screen 1. Consequently, an image represented by image data input to the DMD 210 is foamed on the screen 1.

Here, it is possible to display a color image on the screen 1, for example, by adopting a field sequential image display method. In the field sequential image display method, red rays Lkr of light output from the light source 220, green rays Lkg of light output from the light source 220, and blue rays Lkb of light output from the light source 220 are temporally divided (time division), and caused to sequentially enter the DMD 210. Further, image data Gr representing a red image, image data Gg representing a green image, and image data Gb representing a blue image are input to the DMD 210 synchronously with entrance of the rays of light of respective colors into the DMD 210, and the rays of light of respective colors are modulated.
<Regarding a Light Modulation Unit Using a Liquid Crystal Panel as a Light Valve>

FIG. 3 is a diagram illustrating a light modulation unit using a transmission-type liquid crystal panel as a light valve.

A light modulation unit 200B illustrated in FIG. 3 includes a light source 270, dichroic mirrors 281, 282, liquid crystal panels 260R, 260G, 260B, and a dichroic prism 290 for combining colors. The light source 270 outputs white light, and the dichroic mirrors 281, 282 separate the rays Lk of white light output from the light source 270 into red light, green light and blue light. The liquid crystal panels 260R, 260G, 260B modulate the rays Lk of light separated into respective colors (red rays Lkr of light, green rays Lkg of light, and blue rays Lkb of light). Further, the dichroic prism 290 combines, into a bundle of rays Lk of light, the rays Lk of light of respective colors (red rays Lkr of light, green rays Lkg of light, and blue rays Lkb of light) that have been modulated by being transmitted through the liquid crystal panels 260R, 260G, 260B.

The white light output from the light source 270 is separated into rays Lk of light of respective colors of red, green and blue (red rays Lkr of light, green rays Lkg of light, and blue rays Lkb of light) by the dichroic mirrors 281, 282. Further, the separated rays enter the liquid crystal panels 260R, 260G, 260B, respectively, through the total reflection mirrors 283, 284, 285, or the like.

The red rays Lkr of light, the green rays Lkg of light, and the blue rays Lkb of light modulated through the liquid crystal panels 260R, 260G, 260B are combined into a bundle of rays Lk of light through the dichroic prism 290 for combining colors.

The red rays Lkr of light, the green rays Lkg of light, and the blue rays Lkb of light are modulated, through the liquid crystal panels 260R, 260G, 260B, based on image data Gr, Gg, Gb input to the liquid crystal panels 260R, 260G, 260B.

The rays Lk of light combined through the dichroic prism 290 for combining colors enters the reduction side (the side indicated by arrow +Z in FIG. 3) of the lens 100 for projection, and are output from the magnification side (the side indicated by arrow −Z in FIG. 3) of the lens 100 for projection. Further, the rays Lk of light are projected onto the screen 1. Accordingly, a color image represented by image data input to each of the liquid crystal panels 260R, 260G, 260B is formed on the screen 1.

<Regarding Structure Further Limiting the Basic Structure of the Lens for Projection>

Next, elements or features that further limit the basic structure of the illustrated lens 100 for projection and the projection-type display apparatus 400, and the actions and the effects of the elements or features will be described. The elements or features that further limit the basic structure are not essential to the lens 100 for projection of the present invention nor to the projection-type display apparatus 400 of the present invention.

The lens for projection of the present invention and the projection-type display apparatus of the present invention may satisfy all of the elements or features that further limit the basic structure. Alternatively, only one of the elements or features, or at least two of the elements or features in combination may be satisfied.

First, the meanings of parameters represented by signs in formulas will be described.

Bf: a back focus
f: the focal length of entire lens system
f23: the focal length of an air lens formed between the reduction-side surface of the second-group second lens and the magnification-side surface of the second-group third lens
f2F: the focal length of a magnification-side surface of the second-group second lens
f1F: the focal length of a magnification-side surface of the second-group first lens
f1: the focal length of the second-group first lens
f2: the focal length of the second-group second lens
d12: an air space between the first lens group and the second lens group
Fno: the F-number of the lens for projection
fF: the focal length of each aspheric lens made of resin in the first lens group
f5: the focal length of the second-group fifth lens made of resin

[Structure Limited by Formula (B)]

The formula (B): $f23/f \leq -1.5$, and the formula (B'): $f23/f \leq -2.0$, which is more desirable than the formula (B), regulate the range of the ratio of focal length f23 of an air lens formed between a reduction-side surface of second-group second lens L4 and a magnification-side surface of second-group third lens L5 to, the focal length of the entire lens system (lens 100 for projection).

When the lens 100 for projection is constructed in such a manner that the value of f23/f exceeds the upper limit defined by the formula (B), correction of an image plane becomes difficult.

If the lens 100 for projection is constructed so as to satisfy the formula (B) or the formula (B'), it is possible to suppress generation of such a problem. When the lens 100 for projection is constructed so as to satisfy the formula (B'), it is possible to obtain more desirable lens characteristics than the case of satisfying the formula (B).

[Structure Limited by Formula (C)]

The formula (C) $-0.8 \leq f2F/f1F \leq -0.2$ regulates the range of the ratio of focal length f2F of a magnification-side surface of second-group second lens L4 to focal length f1F of a magnification-side surface of second-group first lens L3.

When the lens 100 for projection is constructed in such a manner that the value of f2F/f1F is lower than the lower limit defined by the formula (C), correction of spherical aberration becomes difficult.

In contrast, when the lens 100 for projection is constructed in such a manner that the value of f2F/f1F exceeds the upper limit defined by the formula (C), it becomes difficult to correct an image plane, while suppressing an increase in the size of a magnification-side lens or lenses and maintaining a predetermined back focus.

If the lens 100 for projection is constructed so as to satisfy the formula (C), it is possible to suppress generation of such a problem.

[Structure Limited by Formula (D)]

The formula (D): $1.5 \leq f1/f \leq 3.0$ regulates the range of the ratio of focal length f1 of second-group first lens L3 to focal length f of entire lens system (lens 100 for projection).

When the lens 100 for projection is constructed in such a manner that the value of f1/f is lower than the lower limit defined by the formula (D), correction of spherical aberration becomes difficult.

In contrast, when the lens 100 for projection is constructed in such a manner that the value of f1/f exceeds the upper limit defined by the formula (D), the size of a lens or lenses arranged on the magnification side becomes large.

If the lens 100 for projection is constructed so as to satisfy the formula (D), it is possible to suppress generation of such a problem.

[Structure Limited by Formula (E)]

The formula (E): $-2.5 \leq f2/f \leq -0.5$ and the formula (E'): $-2.0 \leq f2/f \leq -0.7$, which is more desirable than the formula (E), regulate the range of the ratio of focal length f2 of second-group second lens L4 to focal length f of entire lens system (lens 100 for projection).

When the lens 100 for projection is constructed in such a manner that the value of f2/f is lower than the lower limit defined by the formula (E), correction of spherical aberration becomes difficult.

In contrast, when the value of f2/f exceeds the upper limit defined by the formula (E), it becomes difficult to correct an image plane, while maintaining a predetermined back focus.

If the lens 100 for projection is constructed so as to satisfy the formula (E) or the formula (E'), it is possible to suppress generation of such a problem. When the lens 100 for projection is constructed so as to satisfy the formula (E'), it is possible to obtain more desirable lens characteristics than the case of satisfying the formula (E).

[Structure Limited by Formula (F)]

The formula (F): $0.8 \leq d12/f \leq 2.2$ and the formula (F'): $1 \leq d12/f \leq 1.8$, which is more desirable than the formula (F), regulate the range of the ratio of air space d12 between first lens group G1 and second lens group G2 to focal length f of entire lens system (lens 100 for projection).

When the lens 100 for projection is constructed in such a manner that the value of d12/f is lower than the lower limit defined by the formula (F), correction of spherical aberration and correction of an image plane become difficult.

In contrast, when the lens 100 for projection is constructed in such a manner that the value of d12/f exceeds the upper limit defined by the formula (F), it becomes difficult to suppress an increase in the size of the lens and to maintain a predetermined back focus at the same time.

If the lens 100 for projection is constructed so as to satisfy the formula (F) or the formula (F'), it is possible to suppress generation of such a problem. When the lens 100 for projection is constructed so as to satisfy the formula (F'), it is possible to obtain more desirable lens characteristics than the case of satisfying the formula (F).

[Structure Limited by Formula (G)]

The formula (G): Fno≦1.7 regulates the range of the F-number of the lens 100 for projection.

It is desirable that the lens 100 for projection is constructed in such a manner that the F-number is less than or equal to 1.7.

It is desirable that at least one of lens surfaces S1, S2, S3, S4, constituting first lens group G1, is aspheric. Further, it is more desirable that at least one of lens surfaces S12, S13, S14, S15, constituting second-group fourth lens L6 and second-group fifth lens L7, is aspheric.

Further, both of at least one aspheric lens in first lens group G1 and second-group fifth lens L7 may be made of resin.

Further, it is more desirable the formula (H): −1.1≦fF/f5≦−0.2 is satisfied. The formula (H) regulates the range of the ratio of focal length fF of each aspheric lens made of resin in first lens group G1 to focal length f5 of second-group fifth lens L7 made of resin.

When the lens 100 for projection is constructed in such a manner to satisfy the formula (H), a change in focal length fF of each aspheric lens made of resin in first lens group. G1 due to a change in temperature can be offset by a change in focal length f5 of second-group fifth lens L7 due to the change in temperature. Consequently, it is possible to suppress a shift in the focus position of the lens 100 for projection.

However, when the lens 100 for projection is constructed in such a manner that the value of fF/f5 exceeds the upper limit defined by the formula (H), or is lower than the lower limit defined by the formula (H), a change in focal length fF of each aspheric lens made of resin in first lens group G1 due to a change in temperature becomes difficult to be offset by a change in focal length f5 of second-group fifth lens L7 due to the change in temperature. Consequently, it becomes difficult to suppress a shift in the focus position of the lens 100 for projection caused by a change in temperature.

The lens 100 for projection may be composed of only single lenses. Alternatively, the lens 100 for projection may include a cemented lens or cemented lenses.

<Specific Examples>

With reference to FIGS. 4 through 11, and FIGS. 12A, 12B, 12C and 12D through FIGS. 19A, 19B, 19C and 19D, and Tables 1 through 9, numerical data and the like about lenses for projection in Examples 1 through 8 of the present invention will be described.

FIGS. 4 through 11 are schematic cross sections illustrating the structure of the lenses for projection in Examples 1 through 8, respectively. In FIG. 8, which is a schematic cross section illustrating a lens for projection in Example 5, optical paths of light passing through the lens for projection are also illustrated. FIG. 8 shows that the reduction side of the lens for projection in Example 5 is telecentric. Further, in the lenses for projection in the other examples, namely, Examples 1 through 4 and Examples 6 through 8, the reduction side of the lens for projection may be also telecentric.

In FIGS. 4 through 11, signs L1, L2, . . . represent lenses constituting the lenses for projection. The signs L1, L2, . . . correspond to the order of arrangement of lenses from the magnification side (the side indicated by arrow −Z in FIGS. 4 through 11).

Further, sign LL represents an optical member, such as a TIR prism and a dichroic prism for combining colors, that constitutes a light modulation unit. The optical member LL does not constitute a lens for projection.

Tables 1 through 8 show basic data about the lenses for projection in Examples 1 through 8, respectively. The upper part (indicated by the sign (a)) of each of Tables 1 through 8 shows lens data. The lower part (indicated by the sign (b)) of each of Tables 1 through 8 shows aspheric coefficients. In the lens data, the mark "*" attached to a surface number indicates that a surface represented by the surface number is an aspheric surface.

Here, the following aspheric equation is used:

$$Z = \frac{Y^2/R}{1 + \left(1 - K \cdot \frac{Y^2}{R^2}\right)^{1/2}} + \sum_{i=3}^{n} A_i Y^i,$$

where

Z: the depth of an aspheric surface (the length of a perpendicular from a point on an aspheric surface at height Y to a flat plane perpendicular to the optical axis in contact with the vertex of the aspheric surface (mm), Y: height (a distance from the optical axis) (mm), R: the radius of curvature of a paraxial region of the aspheric surface, K, $A_i$: aspheric coefficients (i=3 through n).

Further, Table 9 shows values the ranges of which are defined by the inequations of formulas (A) through (H) with respect to the lenses for projection in Examples 1 through 8 (values calculated by arithmetic expressions in the inequations, or constants of optical systems of the lenses for projection, which are represented by the sign Fno in the inequations).

The lenses for projection in Examples 1 through 8 satisfy all of the formulas (A) through (F) at the same time. The lenses for projection in Examples 2 through 8 satisfy all of the formulas (A) through (H) at the same time.

In the lens data at the upper part of each of Tables 1 through 8, surface number Si represents the number of an i-th lens surface or the like (i=1, 2, 3, . . . ). The most-magnification-side surface is the first surface, and the surface numbers sequentially increase toward the reduction side (the side indicated by arrow +Z in FIGS. 4 through 11). The lens data include mask Mk and optical member LL.

In the lens data, the optical member LL is regarded as a parallel flat plate to be represented as data. Further, masks are arranged in the lenses for projection in Examples 1 through 7. However, no mask is arranged in the lens for projection in Example 8.

Radius Ri of curvature represents the radius of curvature of the i-th surface (i=1, 2, 3, . . . ). Distance Di between surfaces (i=1, 2, 3, . . . ) represents a distance between the i-th surface and an (i+1)th surface on optical axis Z1. The sign Ri and the sign Di in the lens data correspond to the sign Si (i=1, 2, 3, . . . ), which represents a lens surface or the like.

Further, the sign Ndj represents the refractive index of a j-th optical element (j=1, 2, 3, . . . ) with respect to d-line (wavelength is 587.6 nm). The most-magnification-side optical element is the first optical element, and numbers sequentially increase toward the reduction side. Further, the sign vdj represents the Abbe number of the j-th optical element based on d-line.

Abbe number ν of an optical element based on d-line is obtained by the following equation:

$$\nu = (Nd-1)/(NF-NC),$$

where

NF is the refractive index of the optical member with respect to F-line (486.1 nm), Nd is the refractive index of the optical member with respect to d-line (587.6 nm), and NC is the refractive index of the optical member with respect to C-line 656.3 nm).

In Examples 2 and 3, lens L1 is made of resin. In Examples 4 through 8, lens L2 is made of resin. In Examples 2 through 8, lens L7 is made of resin.

In the lens data of Tables 1 through 8, the radii of curvature and distances between surfaces are normalized by assuming that the focal length of the entire system is 1. Further, the radius of curvature of a surface is positive when the surface is convex toward the magnification side, and negative when the surface is convex toward the reduction side.

Tables 1 through 9 are provided together at the end of the section of "DESCRIPTION OF THE PREFERRED EMBODIMENTS".

FIGS. 12A, 12B, 12C, 12D through FIGS. 19A, 19B, 19C, 19D are diagrams illustrating various aberrations (spherical aberration, astigmatism, distortion, and lateral chromatic aberration, respectively) of the lenses for projection in Examples 1 through 8, respectively. Aberrations with respect to d-line, F-line or C-line are illustrated.

In the diagrams illustrating distortions, a shift amount from an ideal image height f×tan θ is illustrated. The ideal image height f×tan θ is obtained by using focal length f of entire lens system and half angle θ of view (θ is a variable, and $0 \leq \theta \omega$).

As the numerical data about Examples 1 through 8, the diagrams illustrating aberrations, and the like show, these lenses for projection of the present invention have small F-numbers (in other words, fast lenses), while generation of aberrations and an increase in the size of apparatuses are suppressed.

The present invention is not limited to the aforementioned examples, and various modifications are possible without departing from the gist of the present invention. For examples, the values of the radius of curvature of each lens, a distance between surfaces, a refractive index and the like are not limited to the values in the tables, but may be other values.

TABLE 1

EXAMPLE 1

(a)

| SURFACE NUMBER Si | LENS DATA | | | |
|---|---|---|---|---|
| | Ri | Di | Ndj | vdj |
| *1 | −6.991 | 0.14 | 1.4910 | 57.6 |
| *2 | 1.085 | 0.39 | | |
| *3 | −12.536 | 0.09 | 1.4910 | 57.6 |
| *4 | 4.375 | 1.05 | | |
| 5 | 4.059 | 0.25 | 1.7432 | 49.3 |
| 6 | −2.724 | 1.70 | | |
| (Mk) 7 | ∞ | 0.33 | (MASK) | |
| 8 | −2.441 | 0.06 | 1.8467 | 23.8 |
| 9 | 3.381 | 0.10 | | |
| 10 | −7.815 | 0.23 | 1.7130 | 53.9 |
| 11 | −1.669 | 0.01 | | |
| 12 | 2.527 | 0.42 | 1.4875 | 70.2 |
| 13 | −2.567 | 0.01 | | |
| 14 | 2.075 | 0.33 | 1.4875 | 70.2 |
| 15 | −26.516 | 0.54 | | |
| 16 | ∞ | 1.54 | 1.5163 | 64.1 |
| 17 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | 4.2587E−02 | 9.0505E−01 | −1.7954E+00 | 1.5571E+00 | 2.9342E−02 | −2.8488E+00 |
| 2 | 0.0000 | 2.0816E−01 | −3.2884E−01 | 1.8767E+00 | −3.8663E+00 | 8.9353E−01 | 3.5654E+00 |
| 3 | 1.0000 | 0.0000E+00 | −5.1660E−01 | −2.5239E−01 | 5.0526E−01 | 5.6154E−01 | 1.4494E−02 |
| 4 | 0.0000 | 0.0000E+00 | −4.2206E−01 | 4.8631E−01 | −1.2231E−01 | 4.7472E−02 | 1.1832E+00 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.9593E+00 | −1.7344E+00 | 0.0000E+00 | 0.0000E+00 | 0.0000E+00 | 0.0000E+00 |
| 2 | −5.7169E+00 | 3.0627E+00 | 0.0000E+00 | 0.0000E+00 | 0.0000E+00 | 0.0000E+00 |
| 3 | −4.5202E−01 | −1.8101E−01 | 0.0000E+00 | 0.0000E+00 | 0.0000E+00 | 0.0000E+00 |
| 4 | 1.4333E+00 | −2.1683E+00 | 0.0000E+00 | 0.0000E+00 | 0.0000E+00 | 0.0000E+00 |

(THE MARK * REPRESENTS AN ASPHERIC SURFACE)

TABLE 2

EXAMPLE 2

(a)

| SURFACE NUMBER Si | LENS DATA | | | |
|---|---|---|---|---|
| | Ri | Di | Ndj | νdj |
| *1 | 1.456 | 0.15 | 1.4910 | 57.6 |
| *2 | 0.584 | 0.39 | | |
| *3 | 0.843 | 0.13 | 1.4910 | 57.6 |
| *4 | 0.671 | 0.81 | | |
| 5 | ∞ | 0.66 | (MASK) | |
| 6 | 1.920 | 0.33 | 1.7015 | 41.2 |
| 7 | −4.122 | 1.12 | | |
| 8 | −1.009 | 0.06 | 1.8052 | 25.4 |
| 9 | 3.259 | 0.04 | | |
| 10 | 8.342 | 0.40 | 1.5163 | 64.1 |
| 11 | −1.070 | 0.01 | | |
| 12 | 2.282 | 0.56 | 1.4875 | 70.2 |
| 13 | −1.870 | 0.01 | | |
| *14 | 1.800 | 0.25 | 1.4910 | 57.6 |
| *15 | 3.670 | 0.54 | | |
| 16 | ∞ | 1.54 | 1.5163 | 64.1 |
| 17 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −2.4087E−01 | 5.7523E−01 | −1.4615E+00 | 1.8540E+00 | 5.6049E−02 | −3.2092E+00 |
| 2 | 0.0000 | −1.5315E−01 | −4.3375E−01 | 1.9835E+00 | −3.3526E+00 | 1.1170E+00 | 3.4662E+00 |
| 3 | 1.0000 | 0.0000E+00 | −2.2059E+00 | 1.3574E−01 | 1.2002E+00 | 1.0753E+00 | 1.2712E−01 |
| 4 | 0.0000 | 0.0000E+00 | −2.1855E+00 | 9.7954E−01 | 1.3798E+00 | 1.0836E+00 | −3.4419E−02 |
| 14 | 1.0000 | 0.0000E+00 | −9.9651E−02 | 0.0000E+00 | −1.5628E−01 | 0.0000E+00 | 9.4794E−03 |
| 15 | 1.0000 | 0.0000E+00 | −8.0922E−02 | 0.0000E+00 | −2.0374E−01 | 0.0000E+00 | 1.3115E−01 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.6697E+00 | −1.2993E+00 | 0.0000E+00 | 0.0000E+00 | 0.0000E+00 | 0.0000E+00 |
| 2 | −5.7637E+00 | 3.4975E+00 | 0.0000E+00 | 0.0000E+00 | 0.0000E+00 | 0.0000E+00 |
| 3 | −9.2291E−01 | −1.2333E+00 | 0.0000E+00 | 0.0000E+00 | 0.0000E+00 | 0.0000E+00 |
| 4 | −1.4543E+00 | −3.9121E−01 | 0.0000E+00 | 0.0000E+00 | 0.0000E+00 | 0.0000E+00 |
| 14 | 0.0000E+00 | 5.2511E−02 | 0.0000E+00 | 0.0000E+00 | 0.0000E+00 | 0.0000E+00 |
| 15 | 0.0000E+00 | 5.3633E−03 | 0.0000E+00 | 0.0000E+00 | 0.0000E+00 | 0.0000E+00 |

(THE MARK * REPRESENTS AN ASPHERIC SURFACE)

TABLE 3

EXAMPLE 3

(a)

| SURFACE NUMBER Si | LENS DATA | | | |
|---|---|---|---|---|
| | Ri | Di | Ndj | νdj |
| *1 | 2.328 | 0.15 | 1.4910 | 57.6 |
| *2 | 0.990 | 0.38 | | |
| 3 | 6.268 | 0.09 | 1.5163 | 64.1 |
| 4 | 1.270 | 0.97 | | |
| (Mk) 5 | ∞ | 0.43 | (MASK) | |
| 6 | 1.779 | 0.31 | 1.7234 | 38.0 |
| 7 | −5.976 | 1.09 | | |
| 8 | −1.004 | 0.06 | 1.8052 | 25.4 |
| 9 | 3.259 | 0.03 | | |
| 10 | 5.246 | 0.49 | 1.5163 | 64.1 |
| 11 | −1.165 | 0.01 | | |
| 12 | 2.283 | 0.61 | 1.4875 | 70.2 |
| 13 | −1.836 | 0.01 | | |
| *14 | 1.842 | 0.30 | 1.4910 | 57.6 |
| *15 | 4.428 | 0.55 | | |

TABLE 3-continued

EXAMPLE 3

| | | | | | |
|---|---|---|---|---|---|
| 16 | ∞ | 1.54 | 1.5163 | | 64.1 |
| 17 | ∞ | | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 1 | 1.0000 | 5.4862E−02 | 2.0649E−01 | −1.1356E+00 | 1.9398E+00 | −1.2102E−03 | −3.3700E+00 |
| 2 | 0.0000 | 8.4845E−02 | 8.5136E−03 | 8.9855E−02 | −6.3936E−01 | 1.7250E+00 | 1.6754E+00 |
| 14 | 1.0000 | 0.0000E+00 | −6.1350E−02 | 2.4184E−02 | −9.3703E−02 | −2.6689E−02 | −2.6979E−02 |
| 15 | 1.0000 | 0.0000E+00 | −1.9972E−02 | 4.6385E−02 | −1.1976E−01 | −2.6628E−02 | −4.3726E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.5593E+00 | −1.2470E+00 | 3.1014E−02 | 1.8307E−02 | 9.2210E−03 | 4.2289E−03 |
| 2 | −7.4841E+00 | 5.4348E+00 | −2.0479E−01 | −1.2540E−01 | −6.8187E−02 | −3.4292E−02 |
| 14 | 7.4923E−03 | −4.1024E−02 | 0.0000E+00 | 0.0000E+00 | 0.0000E+00 | 0.0000E+00 |
| 15 | 9.8482E−03 | 1.1396E−02 | 0.0000E+00 | 0.0000E+00 | 0.0000E+00 | 0.0000E+00 |

(THE MARK * REPRESENTS AN ASPHERIC SURFACE)

TABLE 4

EXAMPLE 4

(a)

| SURFACE NUMBER Si | LENS DATA | | | |
|---|---|---|---|---|
| | Ri | Di | Ndj | vdj |
| 1 | 2.075 | 0.09 | 1.5163 | 64.1 |
| 2 | 0.940 | 0.34 | | |
| *3 | 2.915 | 0.13 | 1.4910 | 57.6 |
| *4 | 1.049 | 1.13 | | |
| (Mk) 5 | ∞ | 0.21 | (MASK) | |
| 6 | 1.744 | 0.29 | 1.7234 | 38.0 |
| 7 | −8.405 | 1.21 | | |
| 8 | −1.010 | 0.06 | 1.8052 | 25.4 |
| 9 | 3.053 | 0.02 | | |
| 10 | 4.843 | 0.43 | 1.6031 | 60.6 |
| 11 | −1.212 | 0.19 | | |
| 12 | 2.456 | 0.55 | 1.4875 | 70.2 |
| 13 | −1.924 | 0.01 | | |
| *14 | 1.801 | 0.27 | 1.4910 | 57.6 |
| *15 | 4.989 | 0.55 | | |
| 16 | ∞ | 1.54 | 1.5163 | 64.1 |
| 17 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 3 | 1.0000 | −4.5553E−02 | 3.2388E−01 | −3.6621E−01 | 2.1686E−01 | −3.3163E−02 | −5.8560E−02 |
| 4 | 1.0000 | −5.6558E−02 | 2.3840E−01 | −2.8980E−01 | −1.3890E−01 | 1.6183E−01 | −3.8183E−02 |
| 14 | 1.0000 | 0.0000E+00 | −3.9005E−02 | −5.3900E−02 | 1.4388E−03 | −4.3694E−02 | −4.1959E−02 |
| 15 | 1.0000 | 0.0000E+00 | −1.6441E−02 | −3.7355E−03 | −1.0696E−01 | 2.9177E−02 | −2.8975E−02 |

| SURFACE NUMBER Si | ASPHERIC COEFFICIENT | | | | | |
|---|---|---|---|---|---|---|
| | A9 | A10 | A11 | A12 | A13 | A14 |
| 3 | −4.2026E−02 | 3.0460E−02 | 1.3276E−01 | 1.6897E−01 | 3.4396E−02 | −3.7377E−01 |
| 4 | −1.0659E−01 | −4.1166E−02 | 9.6265E−02 | 2.8088E−01 | 2.5612E−01 | −1.0830E+00 |
| 14 | 1.2586E−02 | −1.6580E−02 | 0.0000E+00 | 0.0000E+00 | 0.0000E+00 | 0.0000E+00 |
| 15 | 2.5934E−03 | −2.1220E−03 | 0.0000E+00 | 0.0000E+00 | 0.0000E+00 | 0.0000E+00 |

(THE MARK * REPRESENTS AN ASPHERIC SURFACE)

TABLE 5

EXAMPLE 5

(a)

| SURFACE NUMBER Si | LENS DATA | | | |
|---|---|---|---|---|
| | Ri | Di | Ndj | vdj |
| 1 | 2.192 | 0.09 | 1.5163 | 64.1 |
| 2 | 0.956 | 0.31 | | |
| *3 | 2.123 | 0.13 | 1.4910 | 57.6 |
| *4 | 0.929 | 1.19 | | |
| (Mk) 5 | ∞ | 0.18 | (MASK) | |
| 6 | 1.843 | 0.27 | 1.7234 | 38.0 |
| 7 | −8.169 | 1.29 | | |
| 8 | −1.022 | 0.06 | 1.7847 | 25.7 |
| 9 | 3.347 | 0.03 | | |
| 10 | 5.695 | 0.45 | 1.6031 | 60.6 |
| 11 | −1.230 | 0.12 | | |
| 12 | 2.407 | 0.55 | 1.4875 | 70.2 |
| 13 | −1.988 | 0.01 | | |
| *14 | 1.858 | 0.26 | 1.4910 | 57.6 |
| *15 | 4.989 | 0.57 | | |
| 16 | ∞ | 1.54 | 1.5163 | 64.1 |
| 17 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 3 | 1.0000 | −3.9105E−02 | 1.7217E−01 | −6.1172E−01 | 1.0376E+00 | −7.6001E−02 | −9.0619E−01 |
| 4 | 1.0000 | −1.9138E−02 | −2.5451E−01 | 5.4005E−01 | −9.3507E−01 | 7.8749E−02 | 9.0565E−01 |
| 14 | 1.0000 | 0.0000E+00 | −1.8829E−02 | −9.0656E−02 | 5.1486E−03 | −2.7515E−03 | −3.3345E−02 |
| 15 | 1.0000 | 0.0000E+00 | 1.1233E−02 | −6.8991E−02 | −6.5641E−02 | 6.4661E−02 | −4.3443E−02 |

| SURFACE NUMBER Si | ASPHERIC COEFFICIENT | | | | | |
|---|---|---|---|---|---|---|
| | A9 | A10 | A11 | A12 | A13 | A14 |
| 3 | −5.6833E−01 | 6.0589E−01 | 1.3695E+00 | 4.1570E−01 | −1.7734E+00 | 2.1689E−01 |
| 4 | 1.8419E−01 | −1.7284E+00 | −2.2616E+00 | 2.0639E+00 | 8.6452E+00 | −8.8594E+00 |
| 14 | −4.2242E−02 | 1.2658E−02 | 0.0000E+00 | 0.0000E+00 | 0.0000E+00 | 0.0000E+00 |
| 15 | −3.9083E−02 | 2.3082E−02 | 0.0000E+00 | 0.0000E+00 | 0.0000E+00 | 0.0000E+00 |

(THE MARK * REPRESENTS AN ASPHERIC SURFACE)

TABLE 6

EXAMPLE 6

(a)

| SURFACE NUMBER Si | LENS DATA | | | |
|---|---|---|---|---|
| | Ri | Di | Ndj | vdj |
| 1 | 2.121 | 0.09 | 1.5163 | 64.1 |
| 2 | 0.940 | 0.30 | | |
| *3 | 2.313 | 0.13 | 1.4910 | 57.6 |
| *4 | 0.944 | 1.22 | | |
| (Mk) 5 | ∞ | 0.09 | (MASK) | |
| 6 | 1.651 | 0.25 | 1.7234 | 38.0 |
| 7 | −11.730 | 1.28 | | |
| 8 | −0.927 | 0.05 | 1.7847 | 25.7 |
| 9 | 3.208 | 0.02 | | |
| 10 | 4.381 | 0.45 | 1.5163 | 64.1 |
| 11 | −1.163 | 0.01 | | |
| 12 | 3.250 | 0.46 | 1.5163 | 64.1 |
| 13 | −1.872 | 0.01 | | |
| *14 | 1.967 | 0.42 | 1.4910 | 57.6 |
| *15 | −29.830 | 0.56 | | |

TABLE 6-continued

EXAMPLE 6

| | | | | |
|---|---|---|---|---|
| 16 | ∞ | 1.54 | 1.5163 | 64.4 |
| 17 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |

| SURFACE NUMBER Si | K | A3 | A4 | A5 | A6 | A7 | A8 |
|---|---|---|---|---|---|---|---|
| 3 | 1.0000 | −7.4248E−02 | 3.7814E−01 | −8.3593E−01 | 1.0884E+00 | −9.7686E−02 | −8.3277E−01 |
| 4 | 1.0000 | −4.4189E−02 | −8.2934E−02 | 4.7448E−01 | −1.1938E+00 | 2.9354E−01 | 1.0460E+00 |
| 14 | 1.0000 | 0.0000E+00 | 5.3354E−03 | −9.7769E−02 | 8.7823E−02 | −4.1840E−03 | −4.1648E−02 |
| 15 | 1.0000 | 0.0000E+00 | 3.1353E−02 | −5.5499E−02 | −9.9458E−03 | 7.9058E−02 | −4.7854E−02 |

| SURFACE NUMBER Si | A9 | A10 | A11 | A12 | A13 | A14 |
|---|---|---|---|---|---|---|
| 3 | −5.0040E−01 | 6.0759E−01 | 1.3235E+00 | 3.6375E−01 | −1.8010E+00 | 1.9811E−01 |
| 4 | 2.0304E−01 | −1.7565E+00 | −2.3074E+00 | 1.9797E+00 | 8.5076E+00 | −8.9165E+00 |
| 14 | −2.4721E−02 | 5.3141E−02 | 0.0000E+00 | 0.0000E+00 | 0.0000E+00 | 0.0000E+00 |
| 15 | −2.7337E−02 | 4.9334E−02 | 0.0000E+00 | 0.0000E+00 | 0.0000E+00 | 0.0000E+00 |

(THE MARK * REPRESENTS AN ASPHERIC SURFACE)

TABLE 7

EXAMPLE 7

(a)

| SURFACE NUMBER Si | LENS DATA | | | |
|---|---|---|---|---|
| | Ri | Di | Ndj | vdj |
| 1 | 2.537 | 0.09 | 1.5163 | 64.1 |
| 2 | 0.949 | 0.26 | | |
| *3 | 1.895 | 0.13 | 1.4910 | 57.6 |
| *4 | 0.915 | 1.23 | | |
| (Mk) 5 | ∞ | 0.15 | (MASK) | |
| 6 | 1.734 | 0.25 | 1.7234 | 38.0 |
| 7 | −9.756 | 1.30 | | |
| 8 | −0.973 | 0.05 | 1.7847 | 25.7 |
| 9 | 3.140 | 0.02 | | |
| 10 | 4.255 | 0.43 | 1.5163 | 64.1 |
| 11 | −1.179 | 0.05 | | |
| 12 | 3.149 | 0.45 | 1.5163 | 64.1 |
| 13 | −1.922 | 0.06 | | |
| *14 | 1.947 | 0.34 | 1.4910 | 57.6 |
| *15 | ∞ | 0.60 | | |
| 16 | ∞ | 1.54 | 1.5163 | 64.1 |
| 17 | ∞ | | | |

(b)

| SURFACE NUMBER Si | K | A3 | A4 | A5 | A6 | A7 | A8 |
|---|---|---|---|---|---|---|---|
| 3 | 1.0000 | −4.7473E−02 | 2.4976E−01 | −6.6311E−01 | 1.1035E+00 | −2.3406E−01 | −8.4397E−01 |
| 4 | 1.0000 | −1.8601E−02 | −2.3847E−01 | 7.4070E−01 | −1.3877E+00 | 3.1751E−01 | 1.0491E+00 |
| 14 | 1.0000 | 0.0000E+00 | 1.3495E−02 | −1.2666E−01 | 1.1732E−01 | 1.5499E−03 | −5.6861E−02 |
| 15 | 1.0000 | 0.0000E+00 | 3.8096E−02 | −8.9105E−02 | 4.0479E−02 | 6.8813E−02 | −7.1902E−02 |

| SURFACE NUMBER Si | A9 | A10 | A11 | A12 | A13 | A14 |
|---|---|---|---|---|---|---|
| 3 | −4.4497E−01 | 6.4523E−01 | 1.3249E+00 | 3.4912E−01 | −1.8105E+00 | 1.8501E−01 |
| 4 | 1.6945E−01 | −1.7720E+00 | −2.2983E+00 | 1.9805E+00 | 8.4736E+00 | −8.8891E+00 |
| 14 | −3.8330E−02 | 5.1424E−02 | 8.0216E−03 | 1.3279E−02 | 3.0333E−03 | 2.4916E−03 |
| 15 | −3.5150E−02 | 5.4687E−02 | 1.1125E−02 | 9.9649E−03 | 3.0411E−03 | 2.2449E−03 |

(THE MARK * REPRESENTS AN ASPHERIC SURFACE)

TABLE 8

EXAMPLE 8

(a)

| SURFACE NUMBER Si | LENS DATA | | | |
|---|---|---|---|---|
| | Ri | Di | Ndj | νdj |
| 1 | 3.979 | 0.09 | 1.5714 | 53.0 |
| 2 | 1.041 | 0.28 | | |
| *3 | 1.737 | 0.13 | 1.4910 | 57.6 |
| *4 | 0.917 | 1.20 | | |
| 5 | 2.642 | 0.25 | 1.8340 | 37.2 |
| 6 | −6.238 | 1.73 | | |
| 7 | −1.109 | 0.06 | 1.7847 | 26.3 |
| 8 | 3.630 | 0.01 | | |
| 9 | 4.383 | 0.31 | 1.5891 | 61.1 |
| 10 | −1.958 | 0.02 | | |
| 11 | 3.791 | 0.64 | 1.5163 | 64.1 |
| *12 | −1.296 | 0.01 | | |
| *13 | 2.104 | 0.36 | 1.4910 | 57.6 |
| *14 | 0.000 | 0.70 | | |
| *15 | 0.000 | 1.63 | 1.5163 | 64.1 |
| 16 | 0.000 | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 3 | 1.0000 | −8.1378E−02 | 1.1302E−01 | −4.9110E−01 | 8.5615E−01 | −1.8103E−01 | −5.8296E−01 |
| 4 | 1.0000 | −6.2113E−02 | −3.4139E−01 | 6.2780E−01 | −1.0743E+00 | 2.0796E−01 | 7.0159E−01 |
| 12 | 1.0000 | 0.0000E+00 | 8.4594E−02 | −5.9970E−02 | −2.4281E−02 | 2.5528E−03 | 5.8472E−03 |
| 13 | 1.0000 | 0.0000E+00 | 6.2234E−02 | −1.3900E−02 | 5.9951E−03 | 4.9033E−03 | 2.8440E−03 |
| 14 | 1.0000 | 0.0000E+00 | −1.0251E−01 | −1.3675E−01 | 4.8353E−02 | −2.1652E−02 | −4.6927E−02 |
| 15 | 1.0000 | 0.0000E+00 | −9.6891E−02 | −1.1247E−01 | 2.6821E−02 | 4.7459E−02 | −5.3018E−02 |

| SURFACE NUMBER Si | ASPHERIC COEFFICIENT | | | | | |
|---|---|---|---|---|---|---|
| | A9 | A10 | A11 | A12 | A13 | A14 |
| 3 | −2.8577E−01 | 3.9348E−01 | 7.6099E−01 | 1.9600E−01 | −9.1009E−01 | 9.3336E−02 |
| 4 | 1.0821E−01 | −1.0630E+00 | −1.3032E+00 | 1.0621E+00 | 4.2923E+00 | −4.2532E+00 |
| 12 | 1.7121E−03 | −1.7548E−03 | 0.0000E+00 | 0.0000E+00 | 0.0000E+00 | 0.0000E+00 |
| 13 | 2.7248E−03 | 3.1935E−03 | 0.0000E+00 | 0.0000E+00 | 0.0000E+00 | 0.0000E+00 |
| 14 | −2.6053E−02 | 3.1629E−02 | 5.7430E−03 | 8.0827E−03 | 2.1706E−03 | 1.5645E−03 |
| 15 | −2.8285E−02 | 2.7481E−02 | 2.2785E−03 | 2.6024E−03 | −1.9497E−04 | 3.0310E−05 |

(THE MARK * REPRESENTS AN ASPHERIC SURFACE)

TABLE 9

| FORMULA No. | ARITHMETIC EXPRESSION OR THE LIKE IN FOMURA | VALUE CALCULATED BY ARITHMETIC EXPRESSION OR THE LIKE IN FOMURA | | | | | | | |
|---|---|---|---|---|---|---|---|---|---|
| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| (A) | Bf/f | 1.5 | 1.5 | 1.5 | 1.6 | 1.6 | 1.6 | 1.6 | 1.8 |
| (B) | f23/f | −2.9 | −5.4 | −6.8 | −7.2 | −7.8 | −7.9 | −7.8 | −12.3 |
| (C) | f2F/f1F | −0.5 | −0.5 | −0.5 | −0.5 | −0.5 | −0.5 | −0.5 | −0.4 |
| (D) | f1/f | 2.2 | 1.9 | 1.9 | 2.0 | 2.1 | 2.0 | 2.1 | 2.3 |
| (E) | f2/f | −1.7 | −1.0 | −1.0 | −0.9 | −1.0 | −0.9 | −0.9 | −1.1 |
| (F) | d12/f | 1.1 | 1.5 | 1.4 | 1.3 | 1.4 | 1.3 | 1.4 | 1.2 |
| (F) | Fno | 1.6 | 1.5 | 1.4 | 1.4 | 1.4 | 1.5 | 1.5 | 1.4 |
| (H) | fF/f5 | — | −0.3 | −0.6 | −0.6 | −0.6 | −0.9 | −1.0 | −1.0 |

What is claimed is:

1. A lens for projection substantially consisting of:

a first lens group; and a second lens group, which are arranged in this order from the magnification side of the lens for projection, wherein the lens for projection is composed of seven lenses, and wherein the reduction side of the lens for projection is telecentric, and wherein the first lens group is composed of two lenses including at least one negative lens, and wherein the second lens group is composed of a positive second-group first lens having a convex surface facing the magnification side, a negative second-group second lens having a concave surface facing the magnification side, a positive second-group third lens having a convex surface facing the reduction side of the lens for projection, a positive second-group fourth lens, and a positive second-group fifth lens, which are arranged in this order from the magnification side, and wherein a space is provided between a reduction-side surface of the second-group second lens and a magnification-side surface of the second-group third lens, and wherein the following formulas (A) and (B) are satisfied:

$$1.2 \leq Bf/f \leq 2.5 \quad (A);$$

and $$f23/f \leq -1.5 \quad (B),$$

where

Bf is a back focus in air of an entire lens system, f is the focal length of the entire lens system, and f23 is the focal length of an air lens formed between the reduction-side surface of the second-group second lens and the magnification-side surface of the second-group third lens.

2. A lens for projection, as defined in claim 1, wherein the following formula (C) is satisfied:

$$-0.8 \leq f2F/f1F \leq -0.2 \quad (C),$$

where f2F is the focal length of a magnification-side surface of the second-group second lens, and f1F is the focal length of a magnification-side surface of the second-group first lens.

3. A lens for projection, as defined in claim 2, wherein the following formulas (D) and (E) are satisfied:

$$1.5 \leq f1/f \leq 3.0 \quad (D);$$

and $$-2.5 \leq f2/f \leq -0.5 \quad (E),$$

where f1 is the focal length of the second-group first lens, and f2 is the focal length of the second-group second lens.

4. A lens for projection, as defined in claim 3, wherein the following formula (F) is satisfied:

$$0.8 \leq d12/f \leq 2.2 \quad (F),$$

where d12 is an air space between the first lens group and the second lens group.

5. A lens for projection, as defined in claim 4, wherein the following formula (G) is satisfied:

$$Fno \leq 1.7 \quad (G),$$

where

Fno is the F-number of the entire lens system.

6. A lens for projection, as defined in claim 5, wherein at least one of surfaces of the lenses constituting the first lens group is aspheric.

7. A lens for projection, as defined in claim 6, wherein at least one of surfaces of the second-group fourth lens and the second-group fifth lens is aspheric.

8. A lens for projection, as defined in claim 7, wherein both of at least one aspheric lens in the first lens group and the second-group fifth lens are made of resin.

9. A lens for projection, as defined in claim 8, wherein the following formula (H) is satisfied:

$$-1.1 \leq fF/f5 \leq -0.2 \quad (H),$$

where fF is the focal length of each aspheric lens made of resin in the first lens group, and f5 is the focal length of the second-group fifth lens made of resin.

10. A lens for projection, as defined in claim 1, wherein the following formulas (D) and (E) are satisfied:

$$1.5 \leq f1/f \leq 3.0 \quad (D);$$

and $$-2.5 \leq f2/f \leq -0.5 \quad (E),$$

where f1 is the focal length of the second-group first lens, and f2 is the focal length of the second-group second lens.

11. A lens for projection, as defined in claim 1, wherein the following formula (F) is satisfied:

$$0.8 \leq d12/f \leq 2.2 \quad (F),$$

where d12 is an air space between the first lens group and the second lens group.

12. A lens for projection, as defined in claim 1, wherein the following formula (G) is satisfied:

$$Fno \leq 1.7 \quad (G),$$

where

Fno is the F-number of the entire lens system.

13. A lens for projection, as defined in claim 1, wherein at least one of surfaces of the lenses constituting the first lens group is aspheric.

14. A lens for projection, as defined in claim 13, wherein at least one of surfaces of the second-group fourth lens and the second-group fifth lens is aspheric.

15. A lens for projection, as defined in claim 14, wherein both of at least one aspheric lens in the first lens group and the second-group fifth lens are made of resin.

16. A lens for projection, as defined in claim 15, wherein the following formula (H) is satisfied:

$$-1.1 \leq fF/f5 \leq -0.2 \quad (H),$$

where fF is the focal length of each aspheric lens made of resin in the first lens group, and f5 is the focal length of the second-group fifth lens made of resin.

17. A projection-type display apparatus comprising:

a lens for projection, as defined in claim 1;

a light source; and a light valve that modulates rays of light output from the light source, wherein the rays of light modulated by the light valve are projected through the lens for projection.

* * * * *